United States Patent Office 3,709,718
Patented Jan. 9, 1973

3,709,718
GRAFT POLYMERIZATION PRODUCTS
AND PROCESSES
Eckehard Schamberg, Wallisellen, Zurich, and Juerg
Hoigné, Zurich, Switzerland, assignors to Inrescor A.G.,
Schwerzenbach, Switzerland
No Drawing. Filed Dec. 4, 1970, Ser. No. 95,368
Claims priority, application Switzerland, Dec. 12, 1969,
18,491/69; Apr. 21, 1970, 5,910/70
Int. Cl. B44d 1/50
U.S. Cl. 117—93.31
12 Claims

ABSTRACT OF THE DISCLOSURE

Processes for grafting polymerizable materials onto sheets of high polymer which comprise irradiating at least one surface of such a sheet while it is in contact with a belt impregnated with a radical-polymerizable substance at a temperature in the second-order transition range of the sheet; as well as products obtained thereby.

BACKGROUND OF THE INVENTION

The present invention relates to novel processes for graft polymerizing radical-polymerizable compounds onto the surfaces of non-fabric substrates of high polymers, and to products so obtained.

Radical polymerizable compounds may often be grafted onto macromolecular substrates with very high yields by direct polymerization or copolymerization induced by high-energy radiation, e.g. onto polyethylene, polypropylene, or polyvinyl chloride, so that the properties of the macromolecular substrate in question are altered. It is, however, also known that several high polymers, such as saturated polyesters and polyacrylonitrile, show only very little tendency towards grafting by high-energy ionizing radiation. Since the polymerization yield generally increases with rising temperaure, graft reactions on such high polymers may be effected at increased temperature, but such elevated temperature involves various disadvantages and create difficult technical problems, particularly when the vapor pressure of the system employed exceeds one atmosphere at the working temperature. With the relatively low boiling temperatures of many polymerizable compounds, it is therefore often advantageous not to exceed working temperatures of between 50° and 80° C.

It has, therefore, already been suggested by applicants to effect radiation-induced radical grafting of high polymers so that the substrate is irradiated together with the polymerizable compound or compounds in the second-order temperature range of the high polymers. In some cases, however, it is difficult to maintain the polymerizable compound or compounds at the reaction temperature with the polymer forming the substrate for an extended time and to irradiate it at this temperature, particularly if thermal homopolymerization of the polymerizable compound or compounds occurs.

This disadvantage can be avoided according to a further suggestion of applicants by heating the substrate and the polymerizable compound or compounds in several steps to the reaction temperature for a short time. In this case, it is not necessary to add inhibitors which might also disturb reaction of the polymerizable compound or compounds with the substrate. Furthermore, it is possible in this way to obtain much higher yields. However, it is difficult in many cases to bring the substrate and the polymerizable compound or compounds to the reaction temperature and to irradiate them at this temperature. This is especially the case when the substrate is present in the form of sheets with a smooth, difficultly wettable surface, such as films and the like.

THE INVENTION

The present invention provides processes for grafting radical-polymerizable substances onto flat non-fabric substrates, such as sheets, of high polymer material so that, inter alia, the surfaces of the substrate are rendered hydrophilic and are accordingly able to be coated with aqueous suspensions, dyed, or otherwise treated (without further pretreatment) to alter the properties of the original substrate material. Briefly, the present processes for treating such flat non-fabric substrates of high polymers comprise irradiating the substrates at a reaction temperature in the second-order transition range of the high polymer while at least one surface of the substrate is in contact with a belt or web, the belt or web being impregnated with a radical-polymerizable compound, so that the compound polymerizes with the surface of the high polymer. The products produced are also contemplated herein.

It has been found according to the herein-described process that subjecting sheets of synthetic high polymers to the high-energy irradiation treatment while such sheets are in contact with one or more supporting belts obviates the aforementioned difficulties heretofore incurred when it has been attempted to graft radical-polymerizable compounds onto the sheets. The supporting belts aid in maintaining the solution, dispersion, or emulsion of the polymerizable compound or compounds in place on the sheet substrate so that the substrate and polymerizable compound or compounds can be raised to the second-order transition temperature and then irradiated.

The belt or web material can be a woven or knitted fabric through which the polymerizable compound or an emulsion or dispersion thereof can pass. The compound can accordingly permeate the belt. Thus, by contrast to the sheet substrate which is subsantially continuous and impermeable, the belt is readily permeable by the polymerizable compound or mixtures of polymerizable compounds. The material of the belt is desirably relatively or completely unreactive with the polymerizable compounds used herein. Accordingly, the belt can be constructed of fibers, such as fiberglass, which are substantially entirely unreactive with the polymerizable compound, or it can be constructed of high polymers the second-order transition temperature of which is higher, preferably at least 20° C. higher than that of the polymer in the substrate sheet to be treated. An example of such polymers would, in certain instances, be the condensation product of meta-phenylenediamine and isophthalic acid.

In one aspect of the present invention, the substrate to be treated is placed between two support belts and the combination is first led through a solution or emulsion of polymerizable compound or compounds, the latter penetrating through the support belts and coming into contact with the smooth surface of the substrate to be treated on both sides of the same. The support belts loaded with the monomer solution and the substrate to be treated are now heated to the reaction temperature, irradiated for a short time, and then immediately cooled. Any homopolymerization products which may have been produced are washed out with a suitable solvent. The whole treatment cycle: impregnation, heating, irradiation, cooling, and washing can then be repeated until the desired surface improvement of the substrate has been obtained.

It is frequently also desirable to provide non-fabric flat substrates on only one side of which is grafted the polymerizable compounds contemplated herein. Accordingly, in another aspect of the present invention graft polymerization is effected on only one surface of the substrate by bringing a support belt into contact only with the single surface desired to be treated.

The process for treating only one surface of the substrate can be effected in a number of ways. In one embodiment it is possible to impregnate a single support belt with the solution or emulsion of the polymerizable compound or compounds and to bring it into close contact with the surface of the flat substrate to be treated and to heat and irradiate it in this condition. In order to assure close contact between the support belt and the flat substrate, it is advantageous to have both of them follow an angular or arcuate path in the contact area. The advantage of this method lies in that grafting may also be effected on relatively thick flat substrates since the radiation must only penetrate through the flat substrate and not through the support belt as well.

In another embodiment, it is also possible to superpose two flat substrates, with the surfaces to be treated turned away from each other, to pass them between two impregnated support belts, and to irradiate and heat them in this condition. It is in this case advantageous to seal the superposed films laterally to avoid any penetration of the impregnating solution between the films and obviate the partial double-sided graft polymerization resulting therefrom. Sealing can be effected by welding the edges, by sealing them with polyvinyl acetate, or in any other suitable manner. After treatment, the edges of the films are detached from each other.

This method is suitable for rather thin flat substrates since radiation must penetrate through one support belt, as well as through both flat substrates. Its advantage, however, is that two substrates can be reated simultaneously on one side. Instead of two superposed flat substrates, also a tubeshaped substrate, such as a tube of synthetic material can be passed between two impregnated support belts in flat configuration, heated, and irradiated. The treated tube can be opened by cutting.

According to the present process, graft polymerization or copolymerizations can be effected on non-fabric sheets with a smooth surface, particularly films consisting of saturated polyesters, such as polyethyleneglycol terephthalate, polyacrylates, such as polymethylmethacrylate, polyamides such as polyhexamethylene adipamide (polyamide 6,6), condensation products of epsilon-aminocaproic acid (polyamide 6) or 12-aminododecanoic acid (polyamide 12), polystyrene, halogenated polyolefins, such as polytetrafluoroethylene, and the like.

According to the literature, the second-order transition temperatures for the preferred high polymers are:

|  | ° C. |
|---|---|
| Polyester | 65–85 |
| Polyamide 66 | 45–65 |
| Polyamide 6 | 40–60 |
| Polymethylmethacrylate | 90–110 |
| Polystyrene | 90–110 |

The radiation contemplated for use in the practice of the present invention is ionizing radiation. The radiation can be any high-energy ionizing electromagnetic or particulate radiation. Accelerated electrons, such as produced by conventional apparatus like cascade, van de Graaf, or linear accelerators and the like, are desirably used.

The radical polymerizable compounds for use herein will also be taken to include compounds which copolymerize. Such compounds include these with one or more polymerizable or copolymerizable double bonds, such as substituted or unsubstituted hydrocarbons, carboxylic or dicarboxylic acids containing substituted activated double bonds and esters thereof, vinyl and allyl monomers, particularly itaconic acid, malonic acid, fumaric acid, and their esters or anhydrides; unsubstituted or alkyl-substituted acrylic acids, acrolein, or acrylonitrile; unsubstituted or alkyl-substituted acrylamides or their N-substituted derivatives; unsubstituted or alkyl-substituted alkyl, cycloalkyl or aryl acrylates, unsubstituted or alkyl-substituted hydroxyalkyl or hydroxyaryl acrylates, alkyl-substituted dialkylaminoalkyl acrylates, alkyl-substituted disilicone alkyl acrylates, epoxyalkyl acrylates; vinyl esters such as vinyl acetate and higher carboxylic acid vinyl esters, alkyl substituted vinyl esters of carboxylic acids containing sulfo groups; vinyl ethers, such as unsubstituted or substituted alkyl, cycloalkyl or aryl vinyl ethers; vinyl-substituted silicones; vinyl-substituted aromatic or heterocyclic hydrocarbons; diallyl fumarates; diallyl maleates; allyl-substituted phosphates, phosphites or carbonates; vinyl sulfones and the like.

These polymerizable compounds can be applied alone or in admixture. They can be applied to the substrate in the form of aqueous solutions, solutions in organic solvents, emulsions, dispersions or suspensions. All parts, percentages, proportions, and ratios herein are by weight unless otherwise indicated.

The following examples are given to illustrate embodiments of the invention as it is presently preferred to practice it. It will be understood that these examples are illustrative, and the invention is not to be considered as restricted thereto except as indicated in the appended claims.

EXAMPLE I

A precleaned 50μ thick polyethyleneglycol terephthalate film is sandwiched between two fabric strip belts of fiberglass, and the combination is passed through a 30% solution of methacrylic acid. The fiberglass belts have a relatively large mesh so that the methacrylic acid solution can penetrate easily through the fabric and contact the surfaces of the film. The solution-treated combination is then heated to a temperature of 80°–85° C. in a distance 40 cm. long. Immediately after leaving the heating area, the combination is irradiated at a speed of 2.4 cm./sec. in a 400 kv. electron accelerator with a radiation current of 0.02 mA./cm. The sandwich of film and support belts is cooled and washed in water after withdrawal from the radiation zone, and the cycle of impregnation, heating, irradiation, and washing is repeated four times.

The film is found to have a three-percent weight increase after the treatment. The film can readily be dyed with basic dyes, and its surface has become sufficiently hydrophilic so that it ca nbe coated with aqueous suspensions or emulsions without further pretreatment.

EXAMPLE II

A 300μ thick film of a mixed polymerization product from polyamide 6 and polyamide 66 is sandwiched between two fabric strips consisting of polyethyleneglycol terephthalate fibers, the second-order transition temperature of which is approximately between 80 and 85° C., and passed through a 15% aqueous solution of acrylic acid. The support belts and the film are then brought to a temperature of 50° C. in a heating distance 40 cm. long and irradiated by means of a 400 kv. electron accelerator after having left the heating device. The radiation current of the electron accelerator is 0.02 mA./cm. at an advancing speed of 2.4 cm./sec. After leaving the irradiation zone, the support belt and the film are cooled and washed in water.

The weight increase of the thus treated film is 10%. The strongly hydrophilic surface of the film makes possible coatings without any further pretreatment.

EXAMPLE III

A 300μ thick film consisting of a condensation product of 12-aminododecanoic acid (polyamide 12) is passed over a fabric belt consisting of polyethyleneglycol terephthalate fibers, the second-order transition temperature of which is between about 80 and 85° C., the film and the fabric belt describing an arcuate path in the mutual contact zone. The film and the support belt are simultaneously passed through a 15 percent aqueous solution of acrylic acid, are then heated to a temperature of 50° C. on a heating path 40 cm. long, and irradiated with a 400 kv. electron accelerator immediately after leaving the heating zone. The radiation current of the electron accelerator is 0.02 mA./cm., at a 2.4 cm./sec. speed of advance of the material to be treated.

After leaving the irradiation zone, the film and the support belt are cooled and washed in water. Thereafter, the film is treated in a 1% sodium carbonate solution for 2 hours at boiling temperature. Weight increase of the thus treated film is 7.5%. The treated face of the film is highly hydrophilic, which makes possible coating without any further pretreatment.

EXAMPLE IV

A tube of precleaned 36μ thick film consisting of polyethyleneglycol terephthalate is passed in flat condition sandwiched between two superposed fabric belts consisting of glass fibers through a 20 percent aqueous acrylic acid solution. The support belt fabric has such wide meshes that the monomer solution can easily penetrate through the fabric and come into contact with the outer surface of the film tube.

The support belts impregnated with the acrylic acid solution and the film tube are passed between heating plates 40 cm. long, arranged in parallel at a distance of 3 cm. The upper and the lower plate are heated to a temperature of 350° C. each, so that the outer surface of the film tube when passing between the plates at a speed of 2.4 cm./sec. reaches a temperature of between 80 and 85° C. at the moment when the support belts impregnated with the monomer solution and the film tube leave the heating apparatus. Immediately thereafter, irradiation with electrons of an energy of 400 kv. follows. The radiation current of the electron accelerator is 0.02 mA./cm. After leaving the irradiation zone, the support belts and the film tube are rapidly cooled and thoroughly washed in a water bath. The treatment cycle of impregnation, heating, irradiation, and washing is repeated four times. Thereupon, the film tube is dried and cut open.

The treated film shows a 2.0% weight increase. The treated face of the film, i.e. the outer face of the film, is highly hydrophilic so that one-side coatings, e.g., with aqueous emulsions or suspensions, can be effected without further pretreatment. The face of the film which has been modified also possesses a high affinity towards basic dyes, whereas the untreated film face, i.e., the inner face of the film, does not accept any dye.

EXAMPLE V

Two 36μ thick films consisting of polyethyleneglycol terephthalate are superposed, welded laterally at their edges, and passed through a 20 percent aqueous acrylic acid solution between two glass fiber support belts. The films and the support belts are then, as described in Example IV, passed between the heating plates, the outer film surfaces reaching a temperature of between 80 and 85° C., irradiated in the electron accelerator immediately thereafter, and then thorouhgly washed in water. The treatment cycle of impregnation, heating, irradiation, and washing is repeated five times. Thereafter, the films are dried and their edges detached again.

Each film presents a weight increase of 2%, and the treated face is highly hydrophilic.

What is claimed is:

1. A process for treating a non-fabric sheet of high polymer material which comprises subjecting the sheet to ionizing radiation at a temperature in the second-order transition range while at least one surface of the sheet is in contact with a belt impregnated with at least one radical-polymerizable compound to graft the compound onto the surface.

2. A process according to claim 1 wherein the belt is readily permeable by the polymerizable compound.

3. A process according to claim 1 wherein the belt is fabric and is substantially ungrafted by exposure to the ionizing radiation at the second-order transition temperature of the high polymer material.

4. A process according to claim 1 wherein the belt is of fiberglass.

5. A process according to claim 1 wherein the belt is of a synthetic high polymer, the second-order transition temperature of which synthetic high polymer is at least 20° C. higher than the second-order transition temperature of the polymer in the sheet.

6. A process according to claim 5 wherein the synthetic high polymer is a condensation product of metaphenylenediamine and isophthalic acid.

7. A process according to claim 1 wherein both surfaces of the sheet are treated.

8. A process according to claim 1 wherein only one surface is treated.

9. A process according to claim 8 wherein the sheet and the belt follow an angular or arcuate path while they are in contact with each other.

10. A process according to claim 8 wherein the surfaces of two sheets are in contact with each other and the other surface of each sheet is in contact with an impregnated belt, the two sheets being interposed between two impregnated belts.

11. A process according to claim 8 wherein the sheet is tubular and is interposed between two impregnated belts.

12. A non-fabric sheet of high polymer material, to at least one surface of which has been grafted at least one radical-polymerizable compound according to the process of claim 1.

References Cited

UNITED STATES PATENTS

| | | | |
|---|---|---|---|
| 3,146,146 | 8/1964 | Anderson | 117—93.31 X |
| 3,188,229 | 6/1965 | Graham | 117—93.31 X |
| 3,250,642 | 5/1966 | Parasacco et al. | 117—93.31 |

ALFRED L. LEAVITT, Primary Examiner

J. H. NEWSOME, Assistant Examiner

U.S. Cl. X.R.

8—DIG. 18; 204—159.15